UNITED STATES PATENT OFFICE.

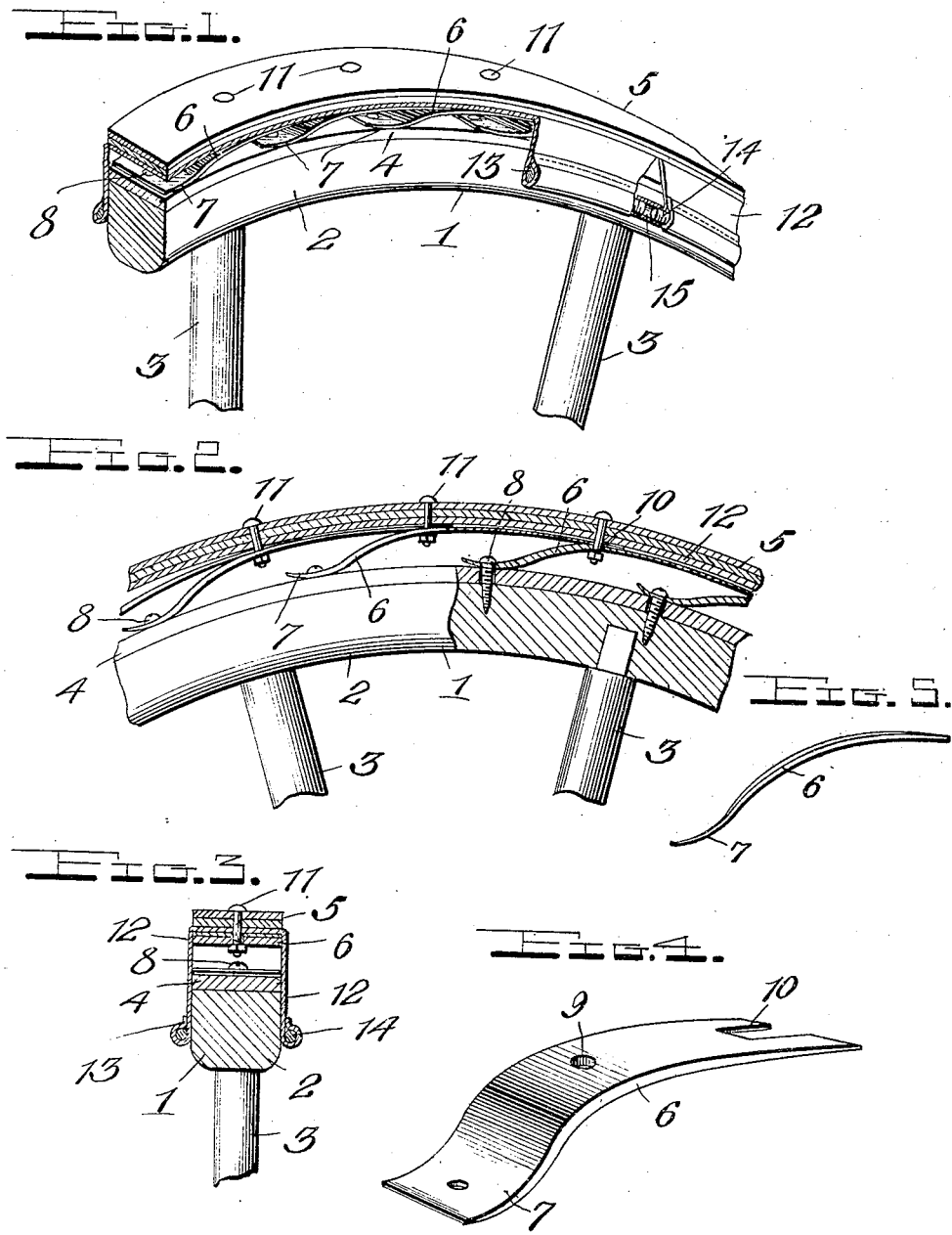

LEWIS L. DAUM, OF CANTON, OHIO.

RESILIENT WHEEL.

979,265.　　　　Specification of Letters Patent.　　Patented Dec. 20, 1910.

Application filed March 9, 1910. Serial No. 548,270.

*To all whom it may concern:*

Be it known that I, LEWIS L. DAUM, a citizen of the United States, residing at Canton, in the county of Stark and State of Ohio, have invented certain new and useful Improvements in Resilient Wheels, of which the following is a specification, reference being had to the accompanying drawings.

My invention relates to improvements in resilient wheels or spring tires for vehicle wheels.

The object of the invention is to provide a device of this character which will be exceedingly strong, durable and effective, and at the same time comparatively inexpensive, and which will be an effective substitute for the ordinary rubber or pneumatic tire.

With the above and other objects in view as will hereinafter appear the invention consists of the novel construction, combination and arrangement of parts hereinafter fully described and claimed, and illustrated in the accompanying drawings in which:—

Figure 1 is a sectional perspective view of a portion of a resilient wheel constructed in accordance with my invention; Fig. 2 is a detail view partly in side elevation and partly in section showing the spring tire; Fig. 3 is a cross sectional view; Fig. 4 is a perspective view of one of the springs; and Fig. 5 is a detail edge view of another form of spring.

My improved resilient wheel may have a body 1 of any form and construction but as illustrated it is similar to the common carriage or wagon wheel and has a wooden felly 2 supported by radiating spokes 3 and covered with a metal band or tire 4.

My improved spring tire consists of an annular tread member 5 which surrounds the body 1 and is supported by an annular series of tangentially arranged, overlapping springs 6 of steel or other suitable metal. Each of these springs is preferably constructed of a steel plate of substantially rectangular shape and curved longitudinally, its thickest portion being at its center, and its end portions being gradually tapered, as shown more clearly in Fig. 4. The inner end 7 of the spring is curved or rounded so as to have a slight rocking movement on the band or tire 4, to which latter it is loosely secured by a screw, bolt or other fastening 8. The intermediate portion of the spring is formed with an opening 9 and the tapered outer or free end of the spring is formed with a notch 10 adapted to overlie the intermediate portion of the next adjacent spring so that bolts or similar fastenings 11 may be passed through the tread member 5, the notch 10 in one spring, and the opening or aperture 9 in the next adjacent spring, whereby these parts will be loosely yet effectively connected. The tread member 5, which is preferably, but not necessarily, constructed of a double layer of rubber belting or analogous material, surrounds the annular series of springs 6 and is supported thereby and secured to them by the bolts or analogous fastenings 11. In this manner the tangentially arranged springs are held in proper position in the annular series and the tread member or tire is also held in place by the bolts or fastenings 9. It will be understood that when the wheel runs along the ground the tangential springs will give sufficiently to produce a resilient effect similar to that produced by a pneumatic tire, and the springs will also rock slightly on their rounded inner ends. These springs may be made from a single piece of steel as shown in Fig. 4, or from two pieces as shown in Fig. 5.

In order to protect the springs 6 and prevent stones and dirt from entering between them, a casing 12 is provided, the same being constructed of canvas or other flexible material and being applied to the device before the tread member or band 5 is arranged on the annular series of springs. This covering or casing 12 extends over the springs and inwardly along the sides of the felly or rim 2, its edges being formed with hems 13 to provide annular tubes in which are arranged contractible hoops or rings 14 adapted to draw the canvas covering 10 tightly around the wheel close to the sides of the felly or rim and thereby prevent the entrance of dust, mud, stones, etc. between the springs. The ends of the hoops 14 are adjustably and detachably united by turn buckle sleeves 15 which engage right and left hand screw threads on said ends of the hoops.

From the foregoing it will be seen that my improved resilient wheel or spring tire is exceedingly simple in construction so that it may be produced at a small cost and will be strong and durable in use. I have found in practice that it produces the same resilient effect as the ordinary rubber or pneumatic tire and is many times more durable than the latter and, of course, free from the annoyance of punctures and other disadvantages common to all pneumatic tires.

Having thus described the invention, what is claimed is:

A wheel of the character described comprising a wheel body consisting of a hub, spokes, a wooden felly, and an annular metal band covering the felly and formed at intervals with openings, an annular tread member of flexible material, an annular series of tangentially arranged overlapping springs, each of the latter having a thick central portion, and tapered ends, said springs having their intermediate portions formed with openings, their inner ends curved longitudinally and engaged with the annular band, for rocking movement, and also formed with openings to register with the openings in said band, and the outer tapered ends of said springs being arranged in overlapping relation, and formed with slots to register with the openings in the intermediate portions of the springs, a flexible casing arranged between the tread member and the overlapping outer ends of the springs, fastenings passing through the tread member, the casing, the slots in the outer ends of the springs, and the openings in the intermediate portions of the same, fastenings passed through the registering openings in the inner ends of the springs, and said band, and into the felly of the wheel body, hems on the edges of said flexible casing, and contractible hoops arranged in said hems, to draw the casing close to the felly of the wheel body.

In testimony whereof I hereunto affix my signature in the presence of two witnesses.

LEWIS L. DAUM.

Witnesses:
S. F. BOWMAN,
LAURA RICKER.